May 15, 1951 V. LENCI ET AL 2,552,898
CONVERSION ARRANGEMENT COUPE TRUNK TO PICKUP BODY
Filed June 9, 1947 2 Sheets-Sheet 1

INVENTOR.
Victor Lenci
BY Raymond Lenci

Att'y

May 15, 1951 V. LENCI ET AL 2,552,898
CONVERSION ARRANGEMENT COUPE TRUNK TO PICKUP BODY
Filed June 9, 1947 2 Sheets-Sheet 2

INVENTOR.
Victor Lenci
Raymond Lenci
BY
Att'y

Patented May 15, 1951

2,552,898

UNITED STATES PATENT OFFICE 2,552,898

CONVERSION ARRANGEMENT COUPÉ TRUNK TO PICKUP BODY

Victor Lenci and Raymond Lenci,
San Rafael, Calif.

Application June 9, 1947, Serial No. 753,553

1 Claim. (Cl. 296—37)

This invention relates to improvements in motor vehicles and has particular reference to an arrangement for converting a coupé trunk into a pickup body.

The principal object of this invention is to provide means whereby an ordinary coupé body member may be swung into reverse position so that a concealed receptacle becomes a pickup body.

A further object is to produce a device of this character which may be attached to any standard motor vehicle of the coupé type without materially altering its construction.

A still further object is to produce a device of this character which is economical to manufacture, one which is neat and attractive in appearance as well as being easy to manipulate.

Other objects and advantages will be apparent during the course of the following description.

In the accompanying drawings forming a part of this specification and in which like numerals are employed to designate like parts throughout the same:

The ordinary coupé trunk is provided with a hinged cover which provides access to the space within the trunk. This arrangement precludes the efficient use of the trunk space as a pickup body for many obvious reasons.

We have, therefore, devised a means whereby a pickup body, that is a box-like structure may be secured within the coupé trunk and be entirely concealed when the coupé is being used for a pleasure car and later moved to an exposed position when it is desired to use the coupé as a pickup vehicle.

In the accompanying drawings wherein for the purpose of illustration is shown a preferred embodiment of our invention, the numeral 5 designates a vehicle as a whole having the customary trunk door 6.

We propose to attach to the under side of the door 6 a pickup body 7, which is substantially a rectangular box-shaped structure.

On each side of the box are rollers 8 and 9, the purpose of which will be later seen.

Figure 1:
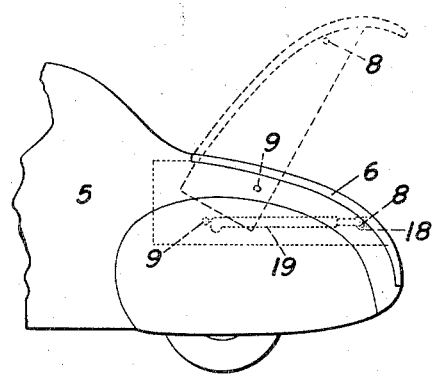
Fig. 1 is a rear side elevation of a motor vehicle showing the conventional trunk door arrangement.

When the vehicle is being used for pleasure purposes, as shown in Fig. 1 the trunk door hinges upwardly, as shown in dotted lines in this figure in the customary manner.

Figure 2:
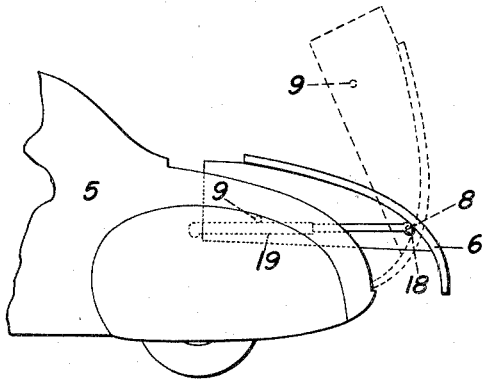
Fig. 2 is a similar view showing the trunk door moved rearwardly.

When it is desired to use the pickup body the user pulls a ring 11 concealed within the body of the car, which in turn actuates cables 12 to retract pintles 13 against the tension of springs 14, which act releases the parts 16 and 17 of the hinges, after which the trunk door may be moved rearwardly, as shown in Fig. 2.

Figure 6:
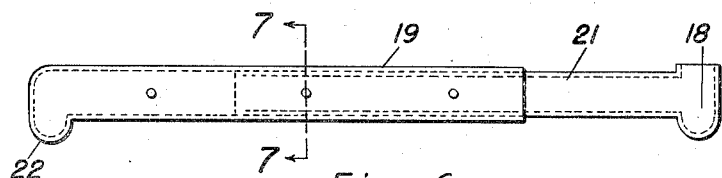
Fig. 6 is an enlarged detailed view of the sliding supporting arm.
Figure 7:
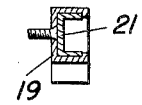
Fig. 7 is a cross sectional view taken on the line 7—7 of Fig. 6.
Figure 8:
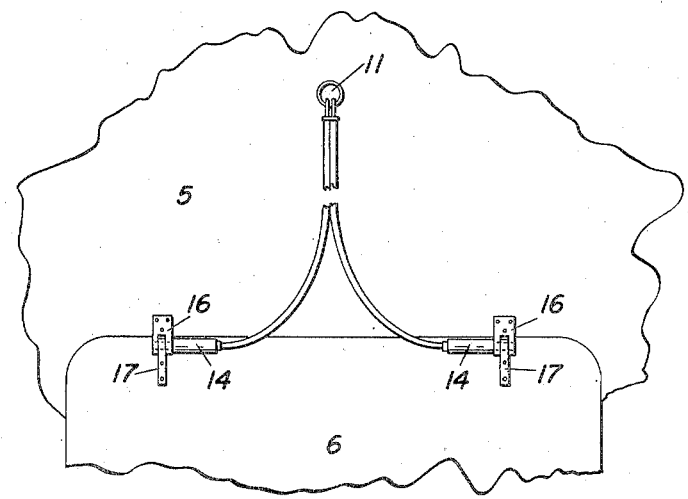
Fig. 8 is a bottom plan view of the coupé hinge release mechanism.
Figure 9:
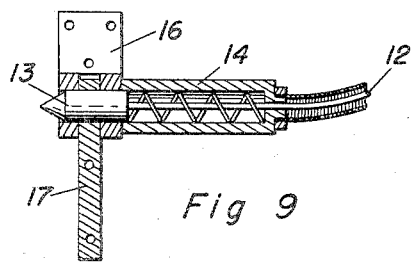
Fig. 9 is a cross sectional view of the hinge release.

During this time the roller 8 is resting in the T-head end 18 of a sliding supporting arm. (See Fig. 6.) This arm consists of telescoping parts 19 and 21, the head 18 being secured to the part 21.

The part 19 has a dropped recess 22, the purpose of which will be later seen.

When the door has been moved to the full line position of Fig. 2 the forward end is raised, as shown in dotted lines, the same pivoting upon the rollers 8.

Figure 3:
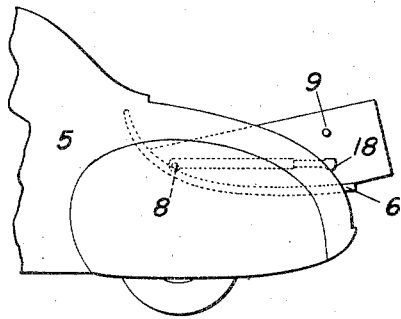
Fig. 3 is a similar view showing the concealed pickup body, moved into exposed position.

Continued movement will move the door into the position of Fig. 3 the rollers 8 passing through the supporting arm members 19 and 21, and the rollers 9 will then enter the T-head 18.

Now, as the body is moved further into the vehicle the sliding portion 21 of the arm will slide in the portion 19, and the rollers 8 will come to rest in the depressions 22. It is, of course, understood that there is one of these sliding supporting arms on each side of the vehicle.

Figure 4:
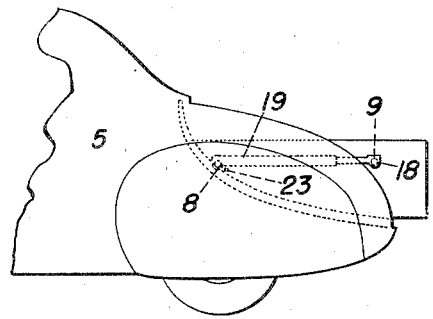
Fig. 4 is a similar view showing the pickup body in fully adjusted position.
Figure 5:
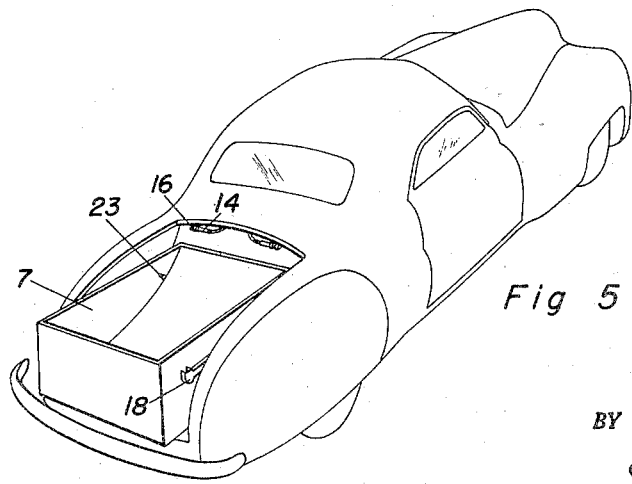
Fig. 5 is a perspective view of the pickup body in final position.

A detent 23 holds the body 7 in locked position after the same has been moved to the position of Fig. 4.

In order to close the body into a conventional coupé the process is merely reversed.

It will thus be seen that we have produced a structure which will permit the accomplishment of all of the objects above set forth.

It is to be understood that the form of our invention herewith shown and described is to be taken as a preferred example of the same and that various changes relative to the material, size, shape and arrangement of parts may be resorted to without departing from the spirit of the invention or the scope of the subjoined claim.

Having thus described our invention, we claim:

In a vehicle having an open rear trunk section, a pair of telescopic, channel-shaped guide bars arranged on opposite sides of said trunk section, each of said guide bars consisting of two telescopic members, each having a depressed recess formed in one of its ends, a door for closing said trunk section, a hinge connecting the front end of said door with the forward portion of said trunk section whereby the door may open at its rear end on said hinge, a box-like structure beneath and secured to said door, spaced rollers mounted on opposite sides of the front and rear of said box-like section, said rollers resting selectively on the recesses of the telescopic members, said hinge including detachable leaves, and means to secure said leaves releasably together, said box-like structure being invertible upon protraction of said guide bars and slidable forwardly in inverted position while supported by the guide bars.

VICTOR LENCI.
RAYMOND LENCI.

REFERENCES CITED

The following references are of record in the file of this patent:

UNITED STATES PATENTS

| Number | Name | Date |
|---|---|---|
| 1,272,620 | Carlson | July 16, 1918 |
| 1,279,635 | Belvel | Sept. 24, 1918 |
| 1,594,291 | Woltz | July 27, 1926 |
| 2,009,051 | King | July 23, 1935 |
| 2,230,334 | Roberts | Feb. 4, 1941 |

FOREIGN PATENTS

| Number | Country | Date |
|---|---|---|
| 453,198 | Germany | Dec. 1, 1927 |
| 849,209 | France | Aug. 11, 1939 |